United States Patent
Maeda et al.

(10) Patent No.: US 8,781,691 B2
(45) Date of Patent: Jul. 15, 2014

(54) POWER SEAT DEVICE

(75) Inventors: Toshiro Maeda, Anjo (JP); Soichiro Hozumi, Nishio (JP)

(73) Assignee: Aisin Seiki Kabushiki Kaisha, Kariya-shi (JP)

(*) Notice: Subject to any disclaimer, the term of this patent is extended or adjusted under 35 U.S.C. 154(b) by 1 day.

(21) Appl. No.: 13/395,239

(22) PCT Filed: Sep. 15, 2010

(86) PCT No.: PCT/JP2010/065896
§ 371 (c)(1),
(2), (4) Date: Mar. 9, 2012

(87) PCT Pub. No.: WO2011/037051
PCT Pub. Date: Mar. 31, 2011

(65) Prior Publication Data
US 2012/0173089 A1 Jul. 5, 2012

(30) Foreign Application Priority Data

Sep. 24, 2009 (JP) .................................. 2009-218839

(51) Int. Cl.
*B60R 22/00* (2006.01)
*B60N 2/02* (2006.01)

(52) U.S. Cl.
CPC ....... *B60N 2/0248* (2013.01); *B60N 2002/0272* (2013.01)
USPC .......................................................... 701/49

(58) Field of Classification Search
CPC .................................................... B60N 2/0248
USPC ..................... 701/1, 49, 36–37; 200/5 R, 6 R
See application file for complete search history.

(56) References Cited

U.S. PATENT DOCUMENTS

| 5,197,007 A | 3/1993 | Parker |
| 5,864,105 A * | 1/1999 | Andrews ....................... 200/5 R |
| 8,099,216 B2 * | 1/2012 | Matsuura et al. ............... 701/49 |

FOREIGN PATENT DOCUMENTS

| JP | 3 271031 | 12/1991 |
| JP | 03271031 A * | 12/1991 |
| JP | 5 193404 | 8/1993 |
| JP | 5 262173 | 10/1993 |

OTHER PUBLICATIONS

Translation of JP05-262173.*
International Preliminary Report on Patentability Issued Apr. 11, 2012 in PCT/JP10/65896 Filed Sep. 15, 2010.
"New Model Instruction Manual for the Toyota Soarer," Toyota Motor Corporation, Total 4 Pages, (May 1991).
International Search Report Issued Oct. 19, 2010 in PCT/JP10/65896 Filed Sep. 15, 2010.

* cited by examiner

*Primary Examiner* — Helal A Algahaim
*Assistant Examiner* — Nga X Nguyen
(74) *Attorney, Agent, or Firm* — Oblon, Spivak, McClelland, Maier & Neustadt, L.L.P.

(57) ABSTRACT

A power seat device includes a motor, an adjustment operation member, a Hall sensor, an ECU, a memory, and a single request operation member. The adjustment operation member adjusts a seat position. The Hall sensor detects a seat position. The ECU drives and controls the motor in accordance with an operation of the adjustment operation member to adjust the seat position. The memory stores two seat positions adjusted by the adjustment operation member. The request operation member sequentially retrieves the two seat positions stored in the memory when pushed. The ECU drives and controls the motor to reinstate the seat position retrieved by the operation of the request operation member. The ECU automatically stores a seat position before the reinstatement of the retrieved seat position is started in the memory.

12 Claims, 3 Drawing Sheets

Fig.5
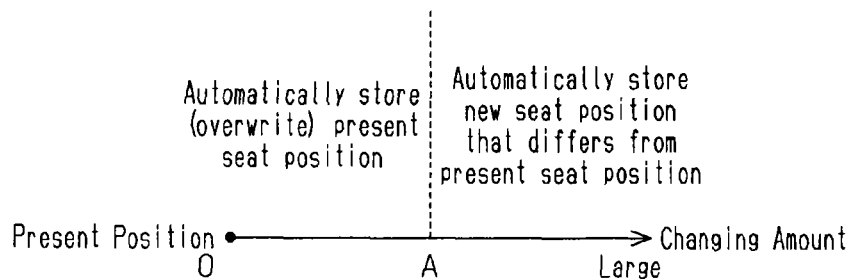
Fig.6(a)    Fig.6(b)
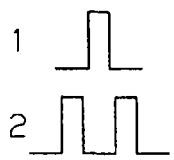 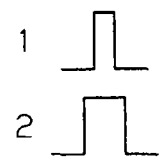
Fig.7
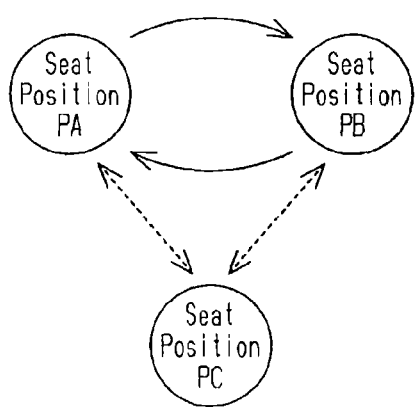
Fig.8
PRIOR ART
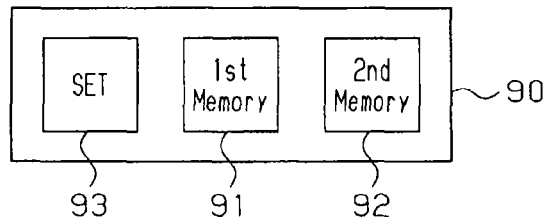

POWER SEAT DEVICE

TECHNICAL FIELD

The present invention relates to a power seat device that detects and stores the state of an adjusted seat and reinstates the stored state of the seat.

BACKGROUND ART

In the prior art, non-patent document 1 describes an example of a known power seat device. The power seat device includes a switch unit 90 shown in FIG. 8 to store the state of the seat that is adjusted by operating manual switches. The switch unit 90 includes a first memory key 91, a second memory key 92, and a set key 93, which are button-shaped. When storing the state of the seat after adjustment with the operation of the manual switches, the first memory key 91 or the second memory key 92 is pushed while pushing the set key 93. The first memory key 91 or the second memory key 92 is also pushed when reinstating the stored state of the seat.

Patent documents 1 and 2 also describe examples of other known power seat devices. In the example of patent document 1, the seat position of a passenger seat stored in a memory is retrieved, and the position is reinstated as the position of the driver seat (driving position). In patent document 2, when an automatic switch is operated in a ride direction to move the seat to an in/out position (ride position), the seat position of the seat at the time of the operation is stored in the memory (automatic storage). Then, the automatic switch is operated in the reinstating direction to reinstate the position of the seat (driving position). This allows the seat position of any seated person to easily be stored and reinstated.

PRIOR ART DOCUMENT

Patent Documents

Patent Document 1: Japanese Laid-Open Patent Publication No. 5-193404

Patent Document 2: Japanese Laid-Open Patent Publication No. 3-271031

Non-Patent Document

Non-Patent Document 1: "New Model Instruction Manual for the Toyota Soarer," Toyota Motor Corporation, May, 1991

DISCLOSURE OF THE INVENTION

Problems that are to be Solved by the Invention

Non-patent document 1 requires the same number of memory keys as the number of stored seat states, that is, the number of people. This inevitably increases the number of components. Patent document 1, on the other hand, can reduce the number of memory keys by using the position of the passenger seat stored in the memory. However, the originally assumed seat position differs between the passenger seat and the driver seat. Thus, a suitable driving position cannot be reinstated in patent document 1. In patent document 2, the position of the seat always overwrites an earlier position when stored in the memory. Thus, when an unintended position of the seat is stored due to an erroneous operation, for example, a desirable stored seat position is erased. Further, only one seat position is automatically stored. Thus, the device is not applicable when there are a number of different seated persons. This lowers the convenience.

It is an object of the present invention to provide a power seat device capable of reinstating the stored state of the seat with a simple structure without lowering the convenience.

To achieve the above object, a power seat device according to one aspect of the present invention includes an electrical drive source, an adjustment operation member, a detection unit, an adjustment unit, a storage unit, a single request operation member, a reinstating unit, and a storage updating unit. The adjustment operation member adjusts a state of a seat. The detection unit detects the state of the seat. The adjustment unit drives and controls the electrical drive source in accordance with an operation of the adjustment operation member and adjusts the state of the seat. The storage unit stores a predetermined number of states of the seat adjusted by the adjustment operation member. The single request operation member sequentially retrieves the states of the seat stored in the storage unit with a predetermined operation. The reinstating unit drives and controls the electrical drive source to reinstate the state of the seat retrieved by the operation of the request operation member. The storage updating unit automatically stores the state of the seat, before the reinstating unit starts to reinstate the retrieved seat state, in the storage unit as one of the predetermined number of seat states based on the operation of the adjustment operation member or the request operation member.

With this structure, when the request operation member undergoes a predetermined operation, the seat states stored in the storage unit are sequentially retrieved and one of the seat states is reinstated. Further, based on the operation of the adjustment operation member or the request operation member, the seat state that existed before the reinstatement of the retrieved seat state starts is automatically stored in the storage unit as one of the predetermined number of seat states. It is obvious that the state of the seat automatically stored in the storage unit can be retrieved and reinstated by the operation of the request operation member. In this manner, there is only one request operation member related to the retrieving and reinstatement of the seat state. This facilitates the switch structure as compared to when there is a plurality of selection switches for the reinstatement and the like of the seat state. Further, the storage updating unit automatically stores the previous seat state in the storage unit while reinstating one of the seat states stored in the storage unit. Thus, the reinstating unit can reuse (reinstate etc.) the seat state that existed before the reinstatement and the convenience is not lowered.

If the storage updating unit is set to automatically store the seat state in the storage unit based on the operation of the adjustment operation member, the seat state after adjustment is stored in the storage unit when the seat state is finely adjusted by the adjustment operation member in accordance with user preference. This ensures that the seat state is stored in the storage unit based on the user's will.

If the storage updating unit is set to automatically store the seat state in the storage unit based on the operation of the request operation member, the present seat state is stored in the storage unit and another seat state is reinstated. Thus, only the most recent seat state before the user operates the request operation member is automatically stored in the storage unit. As a result, even if the user finely adjusts the seat state by operating the adjustment operation member for a number of times before operating the request operation member, only the final adjusted seat state is automatically stored in the storage unit. Accordingly, unnecessary automatic storing is prevented, and an increase in drain current is prevented.

Preferably, the request operation member cyclically retrieves the predetermined number of seat states stored in the storage unit with the predetermined operation.

With this structure, the predetermined number of seat states stored in the storage unit can be cyclically (alternately for two seat states) retrieved with the predetermined operation of the request operation member. This ensures that the user can retrieve the desired seat state just by repetitively operating the request operation member in a predetermined manner in accordance with the cycle.

Preferably, when the request operation member is operated in a state in which a stopped time, in a state of the seat that exists immediately before the reinstating unit starts the reinstatement of the retrieved seat state, is greater than a predetermined time, the storage updating unit automatically stores the state of the seat that existed immediately before the reinstatement in the storage unit.

With this structure, if the seat state is temporarily changed due to erroneous operation of the adjustment operation member, for example, the seat state is not automatically stored in the storage unit even if the request operation member is operated. Thus, an unintended seat state is prevented from being stored (written over an existing state) in the storage unit, and the original necessary seat state is prevented from being erased from the storage unit.

Preferably, under a situation in which the state of the seat is reinstated to one of the seat states retrieved from the storage unit, the storage updating unit automatically stores a present state of the seat as another state of the seat that differs from the one of the seat state in the storage unit when the request operation member is operated in a state in which a changing amount, from when the present state of the seat was reinstated, is greater than a predetermined amount. The storage updating unit automatically stores the present state of the seat as the one of the seat states in the storage unit when the request operation member is operated in a state in which a changing amount from when the present state of the seat was reinstated is less than the predetermined amount.

With this structure, if the changing amount from when the present seat state was reinstated is greater than the predetermined amount, that is, if it is judged that the present seated person differs from the seated person corresponding to the reinstated seat state, the present seat state is newly stored as another seat state without overwriting and erasing the previous seat state (the seat state that existed immediately before the reinstatement of the seat state retrieved by the operation of the request operation member) when the request operation member is operated. In this manner, the storage updating unit can recognize a new seated person and automatically store the seat state in the storage unit separately from an earlier seated person. If the changing amount from when the present seat state is reinstated is less than the predetermined amount, that is, if the current seated person is judged to be the same as the one corresponding to the seat state of the reinstatement, the present seat state is automatically stored and overwrites the retrieved state when the request operation member is operated. In this manner, the existing seated person can be recognized and the seat state can be updated in the memory. This avoids unnecessary storing to the storage unit.

Preferably, the power seat device further includes an interrupt reinstating unit that drives and controls the electrical drive source to reinstate in an interrupt a specific state of the seat that differs from any one of the predetermined number of seat states by performing a number of intermittent operations of the request operation member or by switching operation of the request operation member between a long time and a short time.

With this structure, when a number of intermittent operations of the request operation member is performed or when operation of the request operation member is switched between a long time and a short time, the interrupt reinstating unit reinstates a specific seat state in an interrupt without being limited to the predetermined number of seat states stored in the storage unit. Accordingly, the convenience can be increased by registering the seat state of a specific seated person (guest user) that differs from the assumed seated persons, a seat state of a specific usage mode (e.g., seat state suitable as ride state), or the like as the specific seat state.

Preferably, when the adjustment operation member is operated in a state in which a stopped time, in a state of the seat that exists immediately before the reinstating unit starts the reinstatement of the retrieved seat state, is greater than a predetermined time, the storage updating unit automatically stores the state of the seat that existed immediately before the reinstatement in the storage unit.

With this structure, if the seat state is temporarily changed due to erroneous operation of the adjustment operation member, for example, the seat state is not automatically stored in the storage unit even if the adjustment operation member is operated. Thus, an unintended seat state is prevented from being stored (written over an existing state) in the storage unit, and the original necessary seat state is prevented from being erased from the storage unit.

Preferably, under a situation in which the state of the seat is reinstated to one of the seat states retrieved from the storage unit, the storage updating unit automatically stores a present state of the seat as another state of the seat that differs from the one of the seat states in the storage unit when the adjustment operation member is operated in a state in which a changing amount, from when the present state of the seat was reinstated, is greater than a predetermined amount. The storage updating unit automatically stores the present state of the seat as one of the seat states in the storage unit when the adjustment operation member is operated in a state in which a changing amount, from when the present state of the seat was reinstated, is less than the predetermined amount.

With this structure, if the changing amount from when the present seat state was reinstated is greater than the predetermined amount, that is, if it is judged that the present seated person differs from the seated person corresponding to the reinstated seat state, the present seat state is newly stored as another seat state without overwriting and erasing the previous seat state (the seat state that existed immediately before the reinstatement of the seat state retrieved by the operation of the request operation member) when the adjustment operation member is operated. In this manner, the storage updating unit can recognize a new seated person and automatically store the seat state in the storage unit separately from an earlier seated person. If the changing amount from when the present seat state was reinstated is less than the predetermined amount, that is, if the current seated person is judged to be the same as the one corresponding to the seat state of the reinstatement, the present seat state is automatically stored and overwrites the retrieved state when the adjustment operation member is operated. In this manner, the existing seated person can be recognized and the seat state can be updated in the memory. This avoids unnecessary storing to the storage unit.

Preferably, the power seat device further includes a disabling unit that disables the automatic storing of the storage updating unit when there is no operation of the adjustment operation member in the state of the seat that exists before the reinstating unit starts to reinstate the retrieved seat state.

With this structure, if the seat state is not adjusted by the operation of the adjustment operation member, and, for example, if the seat state when there is no adjustment is already stored as one of the seat states in the storage unit, the seat state when there is no adjustment is not automatically stored in the storage unit. Thus, an unnecessary seat state is prevented from being stored (prevented from overwriting another state) in the storage unit, and an original necessary seat state is prevented from being erased from the storage unit.

A power seat device according to a further aspect of the present invention includes an electrical drive source, an adjustment operation member, a detection unit, an adjustment unit, a storage unit, a single request operation member, a reinstating unit, and a storage updating unit. The adjustment operation member adjusts a state of a seat. The detection unit detects the state of the seat. The adjustment unit drives and controls the electrical drive source in accordance with an operation of the adjustment operation member and adjusts the state of the seat. A storage unit stores a predetermined number of states of the seat adjusted by the adjustment operation member. The single request operation member retrieves the states of the seat stored in the storage unit. The reinstating unit drives and controls the electrical drive source to reinstate the state of the seat retrieved by the operation of the request operation member. The storage updating unit automatically stores the state of the seat immediately before the reinstating unit starts the reinstatement of the retrieved seat state in the storage unit as one of the predetermined number of seat states. The request operation member specifies a state of a seat that is to be reinstated from the predetermined number of seat states by performing a number of intermittent operations of the request operation member or by switching operation of the request operation member between a long time and a short time.

With this structure, when the request operation member undergoes a number of intermittent operations or when operation of the request operation member is switched between a long time and a short time, the request operation member instructs the reinstating unit to reinstate one of the seat states. This reinstates one of the plural seat states stored in the storage unit and reinstates the seat state with the reinstating unit. At the same time, the seat state that existed immediately before the reinstatement of the retrieved seat state is automatically stored in the storage unit as one of the predetermined number of seat states. In this manner, there is only one request operation member related to the retrieving and reinstatement of the seat state. This facilitates the switch structure as compared to when there is a plurality of selection switches for the reinstatement and the like of the seat state. Further, the storage updating unit automatically stores the seat state retrieved by the reinstating unit immediately before the seat state was reinstated in the storage unit while the reinstating unit reinstates one of the plural seat states stored in the storage unit. Thus, the reinstating unit can reuse (reinstate etc.) the retrieved seat state before the reinstatement of the seat state, and the convenience is not lowered.

BRIEF DESCRIPTION OF THE DRAWINGS

FIG. 5 is a graph showing the relationship of a changing amount of a seat position and a storage mode in a modification of the present invention.

FIGS. 6(a) and 6(b) are schematic diagrams showing an operation mode in a modification of the present invention.

FIG. 7 is a schematic diagram showing a control mode in the modification of FIG. 6.

FIG. 8 is a schematic diagram showing a switch unit of the prior art.

DETAILED DESCRIPTION OF THE PREFERRED EMBODIMENTS

One embodiment embodying the present invention will now be described with reference to the drawings.

Figure 1:
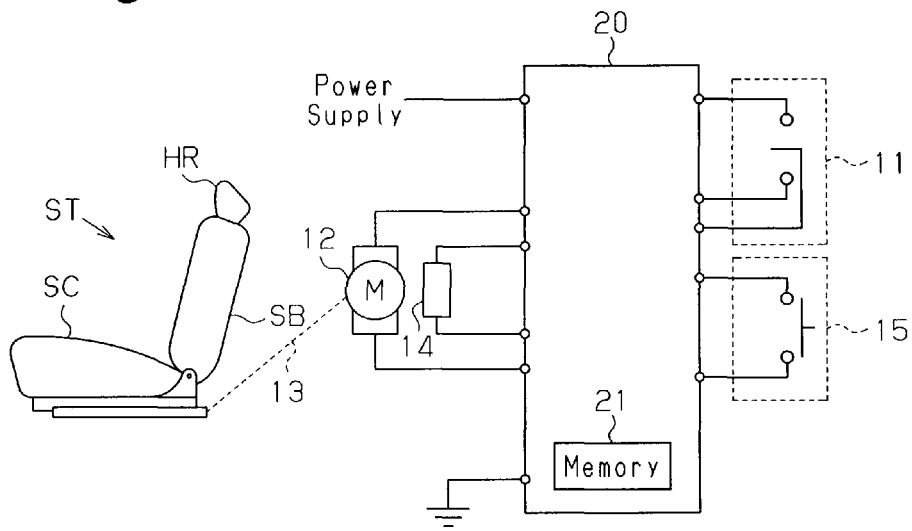
FIG. 1 is a block diagram showing the electrical configuration of a power seat device according to one embodiment of the present invention.

FIG. 1 is a block diagram showing the electrical configuration of a power seat device in the present embodiment. As shown in FIG. 1, a seat ST installed on a vehicle floor includes a seat cushion SC, which forms a seating surface, a seat back SB, which forms a backrest, and a headrest HR, which forms a support for the head of a passenger. The seat back SB is coupled to a rear end of the seat cushion SC and is inclinable in a front to rear direction. The headrest HR is coupled to an upper end of the seat back SB and can be freely raised and lowered. The power seat device includes a mechanism for adjusting the state (position) of the seat ST. This mechanism includes at least one of a seat slide mechanism, a reclining mechanism, a front vertical mechanism, a lifter mechanism, a cushion length mechanism, a side support mechanism, and a headrest raising/lowering mechanism. The seat slide mechanism adjusts the front and rear position of the seat ST. The reclining mechanism adjusts an inclination angle of the seat back SB with respect to the seat cushion SC in the front to rear direction. The front vertical mechanism adjusts the height of a front end of the seat cushion SC. The lifter mechanism adjusts the height of the rear end of the seat cushion SC. The cushion length mechanism adjusts position of the seat cushion SC in the front to rear direction with respect to the seat back SB. The side support mechanism adjusts the projecting length of the two widthwise sides of the seat back SB. The headrest raising/lowering mechanism adjusts the height of the headrest HR. Each mechanism is controlled in the same manner except in that the subject of operation in the seat ST differs. Thus, the seat slide mechanism will be described below as an example.

The seat slide mechanism includes a transmission member 13 driven by a motor 12 serving as an electrical drive source. When the transmission member 13 is driven by the motor 12 in accordance with its direction of rotation, the seat ST moves in the front to rear direction. This adjusts the front and rear position of the seat ST. The mechanical structure of the transmission member 13 that coordinates the motor 12 and the seat ST is not shown in the drawings.

As shown in FIG. 1, the power seat device includes an electronic control unit (ECU) 20 that executes various controls. The ECU 20 is mainly formed by, for example, a microcomputer and incorporates a memory 21 serving as a storage unit including an EEPROM or the like. Power is supplied to the ECU 20 from a battery (not shown) arranged in the vehicle. In the present embodiment, the ECU 20 functions as an adjustment unit, a reinstating unit, a storage updating unit, an interrupt reinstating unit, and a disabling unit.

The ECU 20 is electrically connected to an adjustment operation member 11 installed at the side of the seat cushion SC, for example, to receive an operation signal output from the adjustment operation member 11. The adjustment operation member 11 is a manual switch for operating the seat slide mechanism and instructs a movement direction (forward direction or rear direction) of the seat ST is based on the operation signal.

The ECU 20 is electrically connected to the motor 12 to drive and control the motor 12 by supplying power to the motor 12. For instance, the ECU 20 drives and controls the motor 12 in the rotating direction corresponding to the movement direction of the seat ST instructed by the adjustment operation member 11 by switching the electrical polarity of the power supplied to the motor 12.

Further, the ECU 20 is electrically connected to a Hall sensor 14, which serves as a detection unit that detects the rotation of the motor 12, and receives a detection signal of the Hall sensor 14. The Hall sensor 14 includes a Hall element arranged facing a magnet rotor, which rotates integrally with an output shaft of the motor 12. The Hall sensor 14 outputs a pulse synchronized with the rotation of the motor 12 as the detection signal.

In this configuration, when the adjustment operation member 11 is operated by a user (seated person), the ECU 20 serving as the adjustment unit drive controls the motor 12 in the rotating direction corresponding to the movement direction of the seat ST instructed by the operation signal of the adjustment operation member 11. This moves the seat ST in the front to rear direction in the above-described mode and adjusts the position of the seat ST in the front to rear direction. The ECU 20 counts the pulses output from the Hall sensor 14 in accordance with the rotation of the motor 12 to detect the front to rear position of the seat ST.

The memory 21 stores a predetermined plural number (two) of front to rear positions of the seat ST adjusted by the adjustment operation member 11. The memory 21 includes a first storage unit M1 and a second storage unit M2. The first storage unit M1 stores a first seat position P1, and the second storage unit M2 stores a second seat position P2.

The ECU 20 is electrically connected to a single request operation member 15 arranged, for example, at the side of the seat cushion SC. The request operation member 15 is a normally open momentary switch that becomes conductive only when pushed and outputs a request signal to the ECU 20 at when pushed. The ECU 20 retrieves the seat positions P1 and P2, which are past positions stored in the first storage unit M1 or second storage unit M2 of the memory 21 when the request operation member 15 (operation of a predetermined mode) is pushed. At the same time, the ECU 20, which serves as the reinstating unit, drives and controls the motor 12 to reinstate the retrieved seat positions P1 and P2. In other words, the ECU 20 drives and controls the motor 12 so that the seat position detected by the Hall sensor 14 coincides with the retrieved seat positions P1 and P2. In addition, the ECU 20, which serves as the storage updating unit, automatically stores seat positions after movement of adjustments performed subsequent to the previous reinstatement in the memory 21 (first storage unit M1 or second storage unit M2) as the seat positions P1 and P2.

Figure 2:
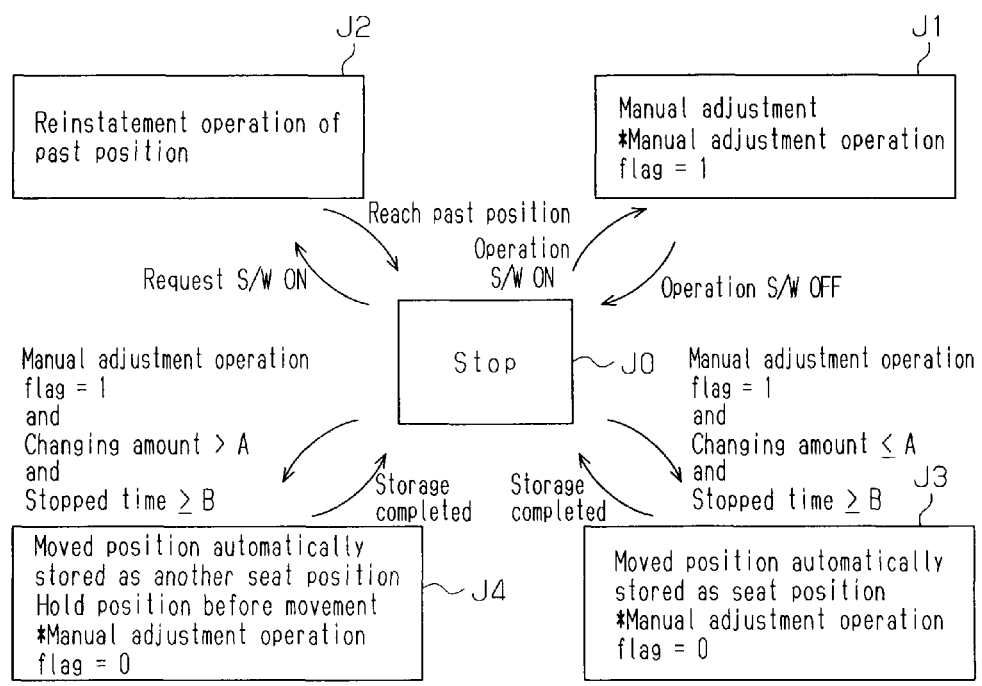
FIG. 2 is a chart showing the transition of a control mode in the device of FIG. 1.

The reinstatement of the retrieved seat positions P1 and P2 and a mode for storing seat positions to the first and second storage units M1 and M2 after movement will now be described. FIG. 2 is a chart showing the transition of states using a stopped state J0 of the motor 12 (seat ST) as a reference. The transition to each state is controlled by the ECU 20 with the operation of the request operation member 15 or the like. The state transition chart will be described under the assumption that the seat position retrieved and reinstated with the most recent push operation of the request operation member 15 is P1. When the seat position retrieved and reinstated with the most recent push operation of the request operation member 15 is P2, the relationship of the seat positions P1 and P2 and the storage units M1 and M2 are basically reversed.

First, in the stopped state J0, the control state shifts to a state J1 of manual adjustment operation when the adjustment operation member 11 is operated by the seated person to adjust the seat position. The motor 12 is then driven, and the seat ST is moved in the front to rear direction as described above. In this case, the ECU 20 sets a manual adjustment operation flag set in the memory 21 to "1". The manual adjustment operation flag indicates that an operation (manual adjustment) of the adjustment operation member 11 has been performed after the present reinstatement operation. The flag is set to "0" immediately after the reinstatement operation and set to "1" after the adjustment operation member 11 is operated. When the operation of the adjustment operation member 11 is stopped by the seated person, the driving of the motor 12 is stopped and the state shifts to the stopped state J0. It is obvious that a changing amount $\Delta P$ (=ABS (PA−P1)), which is the magnitude (absolute value) of the deviation of the seat position after the operation of the adjustment operation member 11, or, the seat position PA after the movement, and the seat position P1 when reinstated, increases and decreases in accordance with the operation amount of the adjustment operation member 11 (total operation amount taking into account positive and negative factors).

In the stopped state J0, for example, when the seated person changes to an originally seated person and the request operation member 15 is operated by the originally seated person to reinstate a different seat position, the control state shifts to a state J2 of reinstatement of a reinstating operation to a different seat position, which is a past position. In this case, the motor 12 is driven and controlled so that the seat position detected by the Hall sensor 14 coincides with the different seat position, which is the past position, and the seat ST is automatically moved in the front to rear direction. When the driving of the motor 12 is stopped, the control state shifts to the stopped state J0.

Further, when the manual adjustment operation flag is "1" (adjustment operation member 11 is operated), the changing amount $\Delta P$ is less than or equal to a predetermined amount A (>0), and a stopped time T in which the motor 12 (seat ST) is stopped is greater than or equal to a predetermined time B, the control state shifts to state J3. In state J3, the ECU 20 automatically stores (overwrites) the seat position PA, after the movement, in the first storage unit M1 as the seat position P1 that is reinstated. At this stage, the manual adjustment operation flag is set (reset) to "0". This is because when the changing amount $\Delta P$ is less than or equal to the predetermined amount A, it is assumed that the seated person corresponds to the reinstated seat position P1 and has finely adjusted and moved the seat position PA by operating the adjustment operation member 11. Accordingly, in state J3, the finely adjusted seat position PA is automatically stored (overwritten) in the first storage unit M1 as the reinstated seat position P1, and the seat position P2 remains held as a past position for the next reinstatement. When the request operation member 15 is operated the next time, the different seat position P2 is reinstated as the past position. When the request operation member 15 is operated the time after the next, the moved seat position PA is reinstated.

When the manual adjustment operation flag is "1", the changing amount $\Delta P$ is greater than the predetermined amount A (>0), and the stopped time T in which the motor 12 (seat ST) is stopped is greater than or equal to the predetermined time B, the control state shifts to state J4. In state J4, the ECU 20 automatically stores (overwrites) the seat position PA, after the movement, in the second storage unit M2 as a different seat position P2, and the seat position P1 remains held as a past position for the next reinstatement. At this stage, the manual adjustment operation flag is set (reset) to "0". This is because when the changing amount ΔP is greater than the predetermined amount A, it is assumed that the seated person differs from the seated person corresponding to the reinstated seat position P1 and has greatly adjusted and moved the seat position PA by operating the adjustment operation member 11. Here, in state J4, the adjusted seat position PA is automatically stored (overwritten) in the second storage unit M2 as the seat position P2, which differs from the seat position P1. The seat position P1 remains held as a past position for the next reinstatement. The seat position P1 is reinstated as a past position the next time the request operation member 15 is operated.

After the automatic storing in state J3 or state J4 is completed, the control state shifts to the stopped state J0. The storing timing of the seat position PA in states J3 and J4 may be when the past position is reinstated the next time the request operation member 15 is operated, or when the final seat position PA is determined upon operation of the adjustment operation member 11. The storing timing is set to after a fixed time (predetermined time B) elapses from the final operation of the adjustment operation member 11, as described above. In particular, when using the adjustment operation member 11 for the storing timing of the seat position PA, whenever the adjustment operation member 11 is operated, the changing amount is used as the changing amount ΔP for determining the switching of states J3 and J4. However, when assuming that the seat position is adjusted by a single operation of the adjustment operation member 11, the seat position PA finally determined in the above-described modes in accordance with the changing amount when the adjustment operation member 11 is operated (changing amount ΔP) may be stored. If, for example, the above storing operation is repeated under the assumption that the seated person is switched between two seated persons UA and UB, in a state in which each changing amount ΔP of the seat position is constantly small after the seat positions P1 and P2 is reinstated (state J3), the moved seat positions PA and PB are respectively stored as the first and second seat positions P1 and P2 in the first and second storage units M1 and M2. In this case, the seat positions PA and PB of the corresponding seated persons UA and UB are cyclically (alternately) retrieved from the first and second storage units M1 and M2 and reinstated when the request operation member 15 is pushed.

Although not shown in FIG. 2, if the adjustment operation member 11 is not operated (seat position is not adjusted) after a reinstatement operation, that is, if the manual adjustment operation flag is "0", the ECU 20 serving as the disabling unit does not carry out the automatic storing of the seat positions P1 and P2. This is because the seat position retrieved and reinstated by the reinstatement operation is the suitable seat position that does not require adjustment by the seated person. Further, the automatic storing of the seat positions P1 and P2 is also not carried out if the stopped time T in which the motor 12 (seat ST) is stopped is less than the predetermined time B. This, for example, prevents an unintended seat position temporarily changed by an erroneous operation or the like of the adjustment operation member 11 from being automatically stored (overwritten) in the memory 21 and prevents the original necessary seat position from being erased from the memory 21. Only the seat position (driving position) that is truly necessary can be stored in the memory 21 by setting the predetermined time B based on the time in which it can be determined driven was actually performed on the driver seat, for example.

Figure 3:
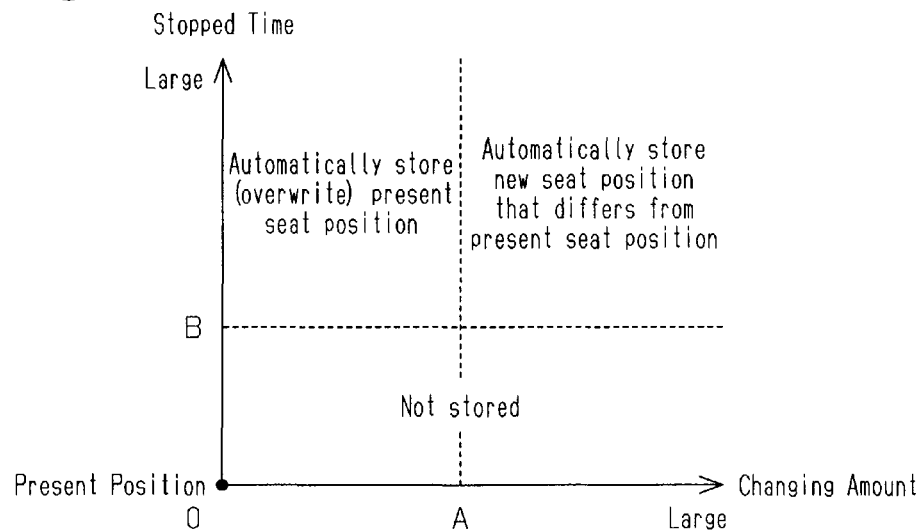
FIG. 3 is a graph showing the relationship of a changing amount of a seat position, the stopped time of a seat, and a storage mode in the device of FIG. 1.

FIG. 3 is a graph showing the relationship of the changing amount ΔP, the stopped time T of the motor 12 (seat ST), and the storage mode of the memory 21. As shown in FIG. 3, the automatic storing of the seat positions P1 and P2 to the memory 21 (first storage unit M1 or second storage unit M2) is not carried out when the stopped time T is less than the predetermined time B, as described above. Further, if the stopped time T is greater than or equal to the predetermined time B and the changing amount ΔP is less than or equal to the predetermined amount A, the seat position immediately before the reinstatement operation is assumed as the seat position adjusted by the seated person who carried out the reinstatement operation, and such seat position is automatically stored (overwritten) in the first and second storage units M1 and M2. If the stopped time T is greater than or equal to the predetermined time B and the changing amount ΔP is greater than the predetermined amount A, the seat position immediately before the reinstatement operation is assumed as a seat position adjusted by a seated person that differs from the seated person who carried out the reinstatement operation, and such seat position is automatically stored in the first and second storage units M1 and M2 as a different seat position.

Figure 4:
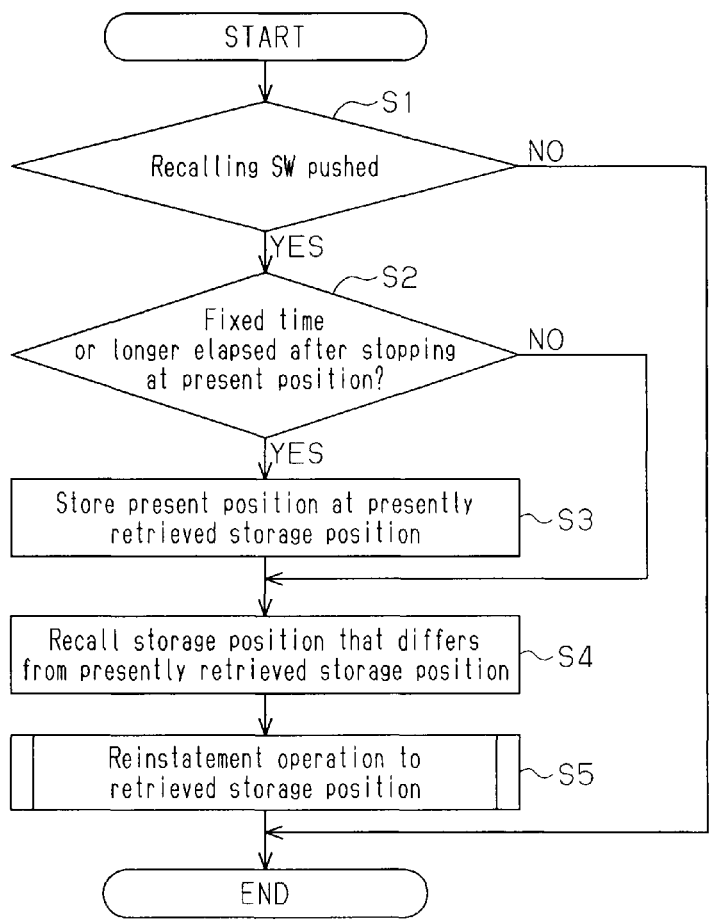
FIG. 4 is a flowchart showing the control mode in the device of FIG. 1.

The operation of the present embodiment will now be described with reference to the flowchart of FIG. 4. It is assumed here that the seat positions PA and PB are respectively stored in the memory 21 in correspondence with the two seated people UA and UB, and a reinstatement process will be mainly described under the assumption that the seated person has switched from seated person UA to the seated person UB. This process is repeatedly executed in regular interrupts whenever a predetermined time elapses, for example.

When the process shifts to the routine, it is first determined whether or not the request operation member 15 has been pushed by the seated person UB (S1). When determined that the request operation member 15 has not been pushed, the subsequent processing is once terminated. When determined that the request operation member 15 has been pushed, it is determined whether or not a fixed time or longer has elapsed from when stopped at the present seat position corresponding to the seated person UA, that is, whether or not the stopped time T at the present seat position is greater than or equal to the predetermined time B (S2).

When determined that the fixed time or longer has elapsed from when stopped at the present seat position, the present seat position is automatically stored (overwritten) as the seat position PA presently retrieved in correspondence with the seated person UA (S3). Then, a seat position PB that differs from the presently retrieved stored position PA is retrieved (S4). If determined that the fixed time or longer has not elapsed from when stopped at the present seat position at S2, the process of S4 is carried out without updating and storing the seat position PA that is presently retrieved in correspondence with the seated person UA.

After the process of S4 is finished, the seat ST is reinstated to the newly retrieved seat position PB (S5), and the subsequent processing are once terminated. Through the above processes, when each of the seat position PA and PB is adjusted according to the operation of the adjustment operation member 11, the moved seat positions PA and PB are respectively updated to the present seat positions PA and PB. In addition, the different seat positions PA and PB can be alternately retrieved and reinstated by the operation of the request operation member 15. Whether or not the adjustment operation member 11 has actually been operated (whether manual adjustment operation flag is "1" or "0") is determined by a logical multiplication during the determination (S2) of the process of S3 related to the storing and updating of the present seat position, which will not be described here. However, the determination of whether or not the adjustment operation member 11 has been operated in S2 by the logical multiplication does not necessarily have to be performed.

As described above in detail, the present embodiment has the following advantages.

(1) In the present embodiment, when the request operation member 15 is pushed, the two seat positions (PA, PB) stored in the memory 21 are sequentially retrieved and either one of the seat positions is reinstated. Further, based on the operation of the adjustment operation member 11 or the request operation member 15, the seat position immediately before the reinstatement of either one of the seat positions starts is automatically stored in the memory 21 as one of the two seat positions. In this manner, there is only one request operation member 15 related to the retrieving and reinstatement of the seat position. This facilitates the switch structure as compared to when there is a plurality of selection switches for the reinstatement and the like of the seat position. This reduces the number of components and cost. The previous seat position is automatically stored in the memory 21 while reinstating one of the two seat positions, which are stored in the memory 21. Thus, the seat position before the reinstatement of the seat position can be reused (reinstated etc.), and the convenience is not lowered.

If the ECU 20 is set to automatically store the seat position in the memory 21 based on the operation of the adjustment operation member 11, the seat position after adjustment is stored in the memory 21 when the seat position is finely adjusted by the adjustment operation member 11 in accordance with user preference. This ensures that the seat position is stored in the memory 21 based on the user's will.

If the ECU 20 is set to automatically store the seat position in the memory 21 based on the operation of the request operation member 15, the seat position when the request operation member 15 is operated is stored in the memory 21 and another seat position is reinstated. Thus, only the most recent seat position before the user operates the request operation member 15 is automatically stored in the memory 21. As a result, even if the user finely adjusts the seat position by operating the adjustment operation member 11 for a number of times before operating the request operation member 15, only the final adjusted seat position is automatically stored in the memory 21. Accordingly, unnecessary automatic storing is prevented, and an increase in drain current is prevented.

(2) In the present embodiment, the two seat positions (PA, PB) stored in the memory 21 can be cyclically (alternately) retrieved by pushing the request operation member 15. This ensures that the user can retrieve the desired seat position just by repetitively pushing the request operation member 15 in a predetermined manner in accordance with the cycle.

(3) In the present embodiment, if the seat position is temporarily changed due to erroneous operation of the adjustment operation member 11, for example, the seat position is not automatically stored in the memory 21 even if the adjustment operation member 11 or the request operation member 15 is operated. Thus, an unintended seat position is prevented from being stored (prevented from overwriting another state) in the memory 21, and the original necessary seat position is prevented from being erased from the memory 21.

(4) In the present embodiment, if the changing amount ΔP from when the present seat position is reinstated is greater than a predetermined amount A, that is, if assumed that the present seated person differs from the seated person corresponding to the seat position during reinstatement, the present seat position is newly stored as another seat position without overwriting and erasing the present seat position (seat position immediately before the reinstatement of the seat position retrieved by the operation of the request operation member 15 is started) when the adjustment operation member 11 or the request operation member 15 is operated. In this manner, the storage updating unit can recognize a new seated person and automatically store the seat position in the memory 21 separately from the earlier seated person. If the changing amount ΔP from when the present seat position is reinstated is less than the predetermined amount A, that is, if the current seated person is judged to be the same as the seated person corresponding to the seat position during the reinstatement, the adjusted seat position is automatically stored (to overwrite the reinstated position) when the adjustment operation member 11 or the request operation member 15 is operated. In this manner, the existing seated person can be recognized and the seat position can be updated in the memory 21. This avoids unnecessary storing to the memory 21.

(5) In the present embodiment, for example, if the seat position is not adjusted by the operation of the adjustment operation member 11, and, for example, if the seat position when there is no adjustment is already stored as one of the two seat positions in the memory 21, the seat position when there is no adjustment is not automatically stored in the memory 21. Thus, an unnecessary seat position is prevented from being stored (overwritten) in the memory 21, and an original necessary seat position is prevented from being erased from the memory 21.

(6) In the present embodiment, since the operation for storing the seat position is unnecessary, the operability can be improved.

The above embodiment may be modified as described below.

As shown in FIG. 5, in the mode of storage to the memory 21, the condition of the stopped time T (comparison of stopped time T and predetermined time B) may be omitted. In this case, if the changing amount ΔP is less than or equal to the predetermined amount A, the present seat position is automatically stored in the corresponding one of the first and second storage units M1 and M2. If the changing amount ΔP is greater than the predetermined amount A, the present seat position is automatically stored in the other one of the first and second storage units M1 and M2 as a different seat position. In the same manner as the embodiment described above, after the reinstatement, if there is no operation of the adjustment operation member 11 (adjustment of seat position), that is, if the manual adjustment operation flag is "0", the automatic storing of the seat positions P1 and P2 does not have to be performed.

Apart from the normal operation (operation of predetermined mode) of the request operation member 15 shown in the upper part of FIG. 6, an irregular operation of the request operation member 15 shown in the lower part of FIG. 6 may be defined. In other words, the request operation member 15 may be intermittently pushed twice (so-called double click) as shown in FIG. 6(*a*) or pushed for a relatively long time (so-called long pushing) as shown in FIG. 6(*b*). The normal operation of the request operation member 15 shown in the upper part of FIG. 6 cyclically (alternately) retrieves the two seat positions (PA, PB) stored in the memory 21, as shown in FIG. 7 and described above. In contrast, the irregular operation of the request operation member 15 shown in the lower part of FIG. 6 is defined as interrupt retrieval and reinstatement of a seat position (storage position PC) that differs from the seat position that is in accordance with the cycle as shown in FIG. 7. In this case, when the irregular operation of the request operation member 15 is detected, the ECU 20, which serves as the interrupt reinstating unit, drives and controls the motor 12 to interrupt and reinstate the seat position (storage position P3). With such control, a specific seat position (storage position PC) can be reinstated in an interrupt by the irregular operation of the request operation member 15 without being limited to the two seat positions (PA, PB) stored in the memory 21. Accordingly, the convenience can be increased by registering the seat position of a specific seated person (guest user) that differs from the assumed seated persons (UA, UB), a seat position of a specific usage mode (e.g., seat position suitable as ride position), or the like as a specific seat position.

In the embodiment described above, two seat positions (storage positions PA, PB) are stored in the memory 21. However, three or more seat positions may be stored in the memory 21. In this case, by repetitively pushing the request operation member 15, the seat position retrieved from the memory 21 may be switched in order to reinstate the desired seat position. The order of the seat positions retrieved from the memory 21 may be the stored order that is in accordance with the cycle or may be in order from high reinstating frequency. In particular, if the reinstating frequency is used, a rarely used seat position in which the reinstating frequency is lower than or equal to a certain level, for example, may be excluded from the reinstatement subjects.

In the embodiment described above, the request operation member may include a so-called alternate switch in which the stopped state is obtained whenever the switch is pushed. In this case, the operation state of the request operation member, that is, the reinstated seat position can be visually checked. This improves the operability.

In the embodiment described above, for example, a rotary encoder or the like may be used as the detection unit in place of the Hall sensor 14.

In the embodiment described above, the seat slide mechanism has been described as a representative example but the present may also be applied to at least one of the reclining mechanism, front vertical mechanism, lifter mechanism, cushion length mechanism, side support mechanism, and headrest raising/lowering mechanism.

One of (e.g., seat position PA) the two seat positions (PA, PB) stored in the memory 21 may be directly retrieved by a pushing the request operation member 15 once as shown in the upper part of FIG. 6, and the other one (e.g., seat position PB) of the two seat positions may be directly retrieved by pushing the request operation member 15 intermittent twice or for a relatively long time, as shown in the lower part of FIG. 6.

The invention claimed is:

1. A power seat device comprising:
An electrical drive source;
An adjustment operation member that adjusts a state of a seat;
A detection unit that detects the state of the seat;
An adjustment unit that drives and controls the electrical drive source in accordance with an operation of the adjustment operation member and adjusts the state of the seat;
A storage unit that stores a predetermined number of states of the seat adjusted by the adjustment operation member;
A single request operation member that sequentially retrieves the states of the seat stored in the storage unit with a predetermined operation;
A reinstating unit that drives and controls the electrical drive source to reinstate a state of the seat retrieved by the operation of the request operation member; and
A storage updating unit that automatically stores a state of the seat that exists before the reinstating unit starts to reinstate the retrieved seat state in the storage unit as one of the predetermined number of seat states based on the operation of the adjustment operation member or the request operation member,
Wherein under a situation in which one of the seat states retrieved from the storage unit is reinstated as a reinstated seat state, and the state of the seat is changed from the reinstated seat state to a present seat state, the storage updating unit operates in accordance with a changing amount of the present seat state from the reinstated seat state based on the operation of the adjustment operation member or the request operation member so that:
The storage updating unit automatically stores the present seat state in the storage unit as the one of the seat states retrieved from the storage unit, or
The storage updating unit automatically stores the present seat state in the storage unit as another seat state that differs from the one of the seat states retrieved from the storage unit
Wherein under a situation in which the state of the seat is reinstated to one of the seat states retrieved from the storage unit, the storage updating unit:
Automatically stores the present seat state as another state of the seat that differs from the one of the seat states retrieved from the storage unit when the request operation member is operated in a state in which the changing amount is greater than a predetermined amount, and
Automatically stores the present seat state as the one of the seat state retrieved from the storage unit when the request operation member is operated in a state in which the changing amount is less than the predetermined amount.

2. The power seat device according to claim 1, wherein the request operation member cyclically retrieves the seat states stored in the storage unit with the predetermined operation.

3. The power seat device according to claim 1, wherein when the request operation member is operated in a state in which a stopped time, in a state of the seat that exists immediately before the reinstating unit starts the reinstatement of the retrieved seat state, is greater than a predetermined time, the storage updating unit automatically stores the state of the seat that exists immediately before the reinstatement in the storage unit.

4. The power seat device according to claim 1, further comprising an interrupt reinstating unit that drives and controls the electrical drive source to reinstate in an interrupt a specific state of the seat that differs from any one of the predetermined number of seat states by performing a number of intermittent operations of the request operation member or by switching operation of the request operation member between a long time and a short time.

5. The power seat device according to claim 1, wherein when the adjustment operation member is operated in a state in which a stopped time, in a state of the seat that exists immediately before the reinstating unit starts the reinstatement of the retrieved seat state, is greater than a predetermined time, the storage updating unit automatically stores the state of the seat that exists immediately before the reinstatement in the storage unit.

6. The power seat device according to claim 1, wherein under a situation in which the state of the seat is reinstated to one of the seat states retrieved from the storage unit, the storage updating unit automatically stores the present seat state as another state of the seat that differs from the one of the seat states retrieved from the storage unit when the adjustment operation member is operated in a state in which the changing amount is greater than a predetermined amount, and automatically stores the present seat state as the one of the seat states retrieved from the storage unit when the adjustment operation member is operated in a state in which the changing amount is less than the predetermined amount.

7. The power seat device according to claim 1, further comprising a disabling unit that disables the automatic storing of the storage updating unit when there is no operation of the adjustment operation member in the state of the seat that exists before the reinstating unit starts to reinstate the retrieved seat state.

8. A power seat device comprising:

An electrical drive source;

An adjustment operation member that adjusts a state of a seat;

A detection unit that detects the state of the seat;

An adjustment unit that drives and controls the electrical drive source in accordance with an operation of the adjustment operation member and adjusts the state of the seat;

A storage unit that stores a predetermined number of states of the seat adjusted by the adjustment operation member;

A single request operation member that retrieves the states of the seat stored in the storage unit;

A reinstating unit that drives and controls the electrical drive source to reinstate a state of the seat retrieved by the operation of the request operation member; and A storage updating unit that automatically stores the state of the seat that exists immediately before the reinstating unit starts the reinstatement & the retrieved seat state in the storage unit as one of the predetermined number of seat states;

Wherein under a situation in which one of the seat states retrieved from the storage unit is reinstated as a reinstated seat state, and the state of the seat is changed from the reinstated seat state to a present seat state, the storage updating unit operates in accordance with a changing amount of the present seat state from the reinstated seat state based on the operation of the adjustment operation member or the request operation member so that:

The storage updating unit automatically stores the present seat state in the storage unit as the one of the seat states retrieved from the storage unit, or The storage updating unit automatically stores the present seat state in the storage unit as another seat state that differs from the one of the seat states retrieved from the storage unit, and Wherein the request operation member specifies a state of a seat that is to be reinstated from the predetermined number of seat states by performing a number of intermittent operations of the request operation member or by switching operation of the request operation member between a long time and a short time Wherein under a situation in which the state of the seat is reinstated to one of the seat states retrieved from the storage unit, the storage updating unit:

Automatically stores the present seat state as another state of the seat that differs from the one of the seat states retrieved from the storage unit when the request operation member is operated in a state in which the changing amount is greater than a predetermined amount, and Automatically stores the present seat state as the one of the seat state retrieved from the storage unit when the request operation member is operated in a state in which the changing amount is less than the predetermined amount.

9. The power seat device according to claim 1, wherein, the storage updating unit automatically stores the state of the seat that exists after the adjustment unit adjusts the state of the seat in the storage unit as one of the predetermined number of seat states when the adjustment unit adjusts the state of the seat to a state that differs from the predetermined number of seat states stored in the storage unit.

10. The power seat device according to claim 8, wherein, the storage updating unit automatically stores the state of the seat that exists after the adjustment unit adjusts the state of the seat in the storage unit as one of the predetermined number of seat states when the adjustment unit adjusts the state of the seat to a state that differs from the predetermined number of seat states stored in the storage unit.

11. The power seat device according to claim 1, wherein, the storage updating unit automatically stores the state of the seat that exists before the reinstating unit starts to reinstate the retrieved seat state in the storage unit as one of the predetermined number of seat states based on the operation of the adjustment operation member or the request operation member when the state of the seat that exists before the reinstating unit starts to reinstate the retrieved seat state differs from the predetermined number of seat states stored in the storage unit.

12. The power seat device according to claim 8, wherein, the storage updating unit automatically stores the state of the seat that exists before the reinstating unit starts to reinstate the retrieved seat state in the storage unit as one of the predetermined number of seat states based on the operation of the adjustment operation member or the request operation member state of the seat that exists immediately before the reinstating unit starts the reinstatement of the retrieved seat state differs from the predetermined number of seat states stored in the storage unit.

* * * * *

UNITED STATES PATENT AND TRADEMARK OFFICE
CERTIFICATE OF CORRECTION

PATENT NO. : 8,781,691 B2
APPLICATION NO. : 13/395239
DATED : July 15, 2014
INVENTOR(S) : Toshiro Maeda et al.

It is certified that error appears in the above-identified patent and that said Letters Patent is hereby corrected as shown below:

In the Claims

Column 13, Claim 1, line 57, "An" should read --an--;
line 58, "An" should read --an--;
line 60, "A" should read --a--;
line 61, "An" should read --an--;
line 65, "A" should read --a--.

Column 14, Claim 1, line 1, "A" should read --a--;
line 4, "A" should read --a--;
line 7, "A" should read --a--;
line 13, "Wherein" should read --wherein--;
lines 21-23, as a paragraph should be indented, and "The storage updating unit" in line 21 should read --the storage updating unit--;
lines 24-27, as a paragraph should be indented, and "The storage updating unit" in line 24 should read --the storage updating unit--;
line 27, "storage unit" should read --storage unit, and--;
line 28, "Wherein" should read --wherein--;
lines 31-35, as a paragraph should be indented, and "Automatically stores" in line 31 should read --automatically stores--;
lines 36-40, as a paragraph should be indented, and "Automatically stores" in line 36 should read --automatically stores--.

Column 15, Claim 8, line 24, "An" should read --an--;
line 25, "An" should read --an--;
line 27, "A" should read --a--;
line 28, "An" should read --an--;
line 32, "A" should read --a--;
line 35, "A" should read --a--;

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,781,691 B2 line 37, "A" should read --a--;

lines 40-44, "A storage updating unit that automatically stores the state of the seat that exists immediately before the reinstating unit starts the reinstatement & the retrieved seat state in the storage unit as one of the predetermined number of seat states;" should read --a storage updating unit that automatically stores a state of the seat that exists immediately before the reinstating unit starts a reinstatement & the retrieval seat state in the storage unit as one of the predetermined number of seat states,--;

line 45, "Wherein" should read --wherein--;

lines 53-55, as a paragraph should be indented, and "The storage updating unit" in line 53 should read --the storage updating unit--.

Column 16, Claim 8, lines 1-4, as a paragraph should be indented, and "The storage updating unit" in line 1 should read --the storage updating unit--;

line 4, "the storage unit, and" should read --the storage unit,--;

line 5, "Wherein" should read --wherein--;

line 10, "a short time" should --a short time, and--;

line 11, "Wherein" should read --wherein--;

line 13, "updating unit:" should read --updating unit--;

lines 14-18, as a paragraph should be indented, and "Automatically stores" in line 14 should read --automatically stores--;

lines 19-23, as a paragraph should be indented, and "Automatically stores" in line 19 should read --automatically stores--.